United States Patent
Chen et al.

(10) Patent No.: US 9,563,242 B2
(45) Date of Patent: Feb. 7, 2017

(54) PULSE WIDTH MODULATION BASED REAL-TIME CLOCK SYSTEM AND ASSOCIATED METHOD

(71) Applicant: MEDIATEK INC., Hsin-Chu (TW)

(72) Inventors: Kuan-Hung Chen, Hsinchu County (TW); Keng-Jan Hsiao, Taoyuan County (TW); Hui-Chun Liu, Chiayi County (TW)

(73) Assignee: MEDIATEK INC., Hsin-Chu (TW)

(*) Notice: Subject to any disclaimer, the term of this patent is extended or adjusted under 35 U.S.C. 154(b) by 87 days.

(21) Appl. No.: 14/599,551

(22) Filed: Jan. 19, 2015

(65) Prior Publication Data
US 2016/0062427 A1    Mar. 3, 2016

Related U.S. Application Data
(60) Provisional application No. 62/042,874, filed on Aug. 28, 2014.

(51) Int. Cl.
| G06F 1/00 | (2006.01) |
| G06F 1/26 | (2006.01) |
| G05F 1/56 | (2006.01) |
| G06F 1/32 | (2006.01) |
| G05F 1/46 | (2006.01) |
| H02M 3/156 | (2006.01) |
| H02M 1/00 | (2006.01) |

(52) U.S. Cl.
CPC . *G06F 1/26* (2013.01); *G05F 1/46* (2013.01); *G05F 1/56* (2013.01); *G06F 1/32* (2013.01); *H02M 3/156* (2013.01); *H02M 2001/0045* (2013.01)

(58) Field of Classification Search
CPC .......................................................... G06F 1/08
USPC .......................................................... 713/500
See application file for complete search history.

(56) References Cited

U.S. PATENT DOCUMENTS

| 7,843,183 B2 * | 11/2010 | Al-Shyoukh | G05F 1/56 323/282 |
| 8,917,069 B2 * | 12/2014 | Howes | G05F 1/575 323/266 |
| 9,075,422 B2 * | 7/2015 | Vemula | G05F 1/573 |
| 9,213,383 B2 * | 12/2015 | Ho | G06F 1/26 |
| 2004/0178778 A1 * | 9/2004 | Bansal | G05F 1/575 323/274 |
| 2007/0216383 A1 * | 9/2007 | Al-Shyoukh | G05F 1/468 323/280 |
| 2008/0189563 A1 | 8/2008 | Itkin | |
| 2009/0224741 A1 | 9/2009 | Marholev | |
| 2012/0154958 A1 * | 6/2012 | Schneider | H02M 1/32 361/18 |
| 2015/0295426 A1 * | 10/2015 | Hirosawa | H02J 7/0019 713/322 |

* cited by examiner

*Primary Examiner* — Suresh Suryawanshi
(74) *Attorney, Agent, or Firm* — Winston Hsu; Scott Margo

(57) ABSTRACT

A pulse width modulation (PWM) based Real-time clock (RTC) system includes a voltage regulator circuit, a capacitor, an RTC circuit and an on-off logic. The voltage regulator circuit is arranged to generate a regulated voltage to a connection node when enabled; the capacitor is coupled to the connection node; the RTC circuit is coupled to the connection node; and the on-off logic is coupled to the voltage regulator circuit and arranged to alternately enable and disable the voltage regulator circuit.

14 Claims, 4 Drawing Sheets

PULSE WIDTH MODULATION BASED REAL-TIME CLOCK SYSTEM AND ASSOCIATED METHOD

CROSS REFERENCE TO RELATED APPLICATIONS

This application claims the benefit of U.S. Provisional Application No. 62/042,874, filed on Aug. 28, 2014, which is incorporated by reference in its entirety.

BACKGROUND

A real-time clock (RTC) is a computer clock that keeps track of the current time. Although the term often refers to the devices in personal computers, servers and embedded systems, RTCs are almost presented in electronic devices which need to keep accurate time. RTCs normally have an alternate source of power, such as a battery, so they can continue to keep time while the primary source of power is unavailable. The battery life is still limited by the size of the alternative battery. To extend battery life, an RTC system with higher power efficiency is required.

SUMMARY

Accordingly, the invention seeks to mitigate, alleviate or eliminate one or more of the above-mentioned disadvantages. Aspects of the invention provide a Real-time clock (RTC) system and associated method, as described in the appended claims.

According to a first aspect of the invention, a pulse width modulation (PWM) based Real-time clock (RTC) system is described. The PWM based RTC system includes a voltage regulator circuit, a capacitor, an RTC circuit and an on-off logic. The voltage regulator circuit is arranged to generate a regulated voltage to a connection node when enabled; the capacitor is coupled to the connection node; the RTC circuit is coupled to the connection node; and the on-off logic is coupled to the voltage regulator circuit and arranged to alternately enable and disable the voltage regulator circuit.

According to a second aspect of the invention, a PWM based RTC method is described. The PWM based RTC method includes: configuring a voltage regulator circuit to generate a regulated voltage to a connection node when enabled; and alternately enabling and disabling the voltage regulator circuit, wherein the connection node is coupled to a capacitor and an RTC circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
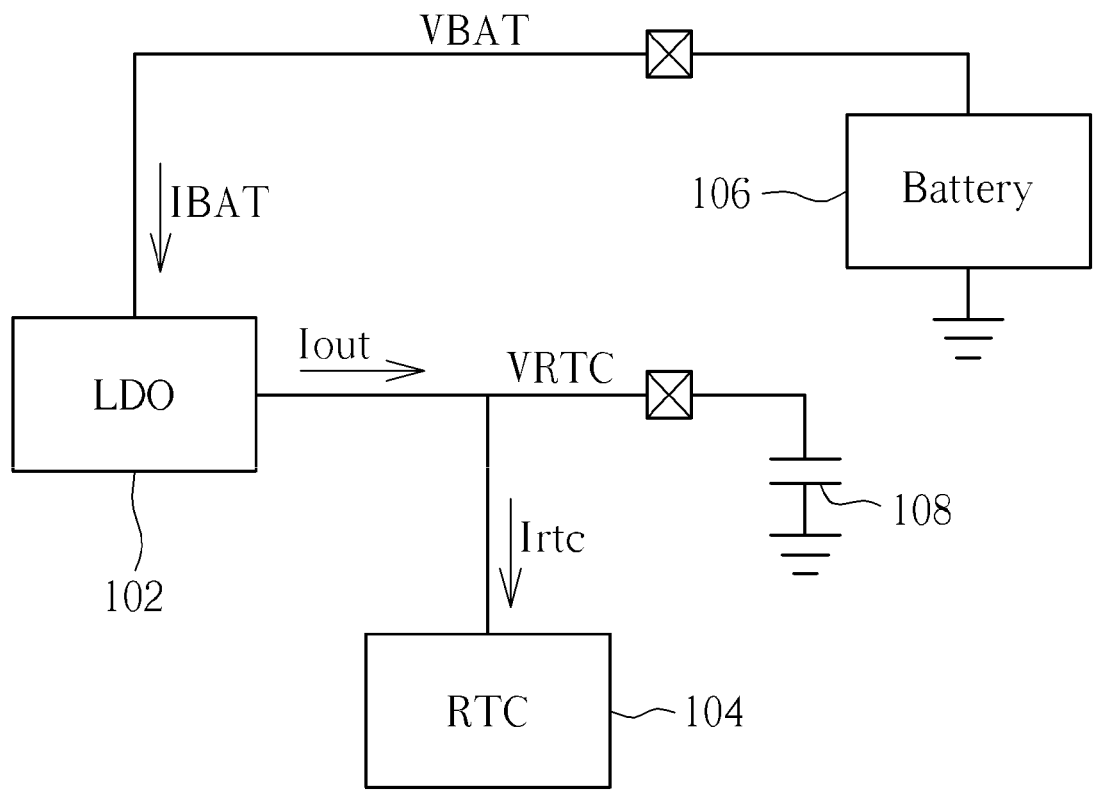
FIG. 1 is a diagram illustrating a PWM based RTC system according to a first embodiment of the invention.

FIG. 1 is a diagram illustrating an RTC system according to a first embodiment of the invention. A Low-Dropout Voltage Regulator (LDO) 102 is a power management component coupled between a battery 106 and an RTC 104. A capacitor 108 is coupled to the LDO 102, and may be used to discharge to the RTC 104 when the battery 106 is depleted or the LDO 102 is disabled. Compared with power consumption of an RTC in a general case, LDOs consume more power from batteries when regulating battery power for RTCs. In this case, the LDO current (IBAT-Iout) may be 5-10 uA on average, whereas the RTC current Irtc may be merely 1-2 uA.

Figure 2:
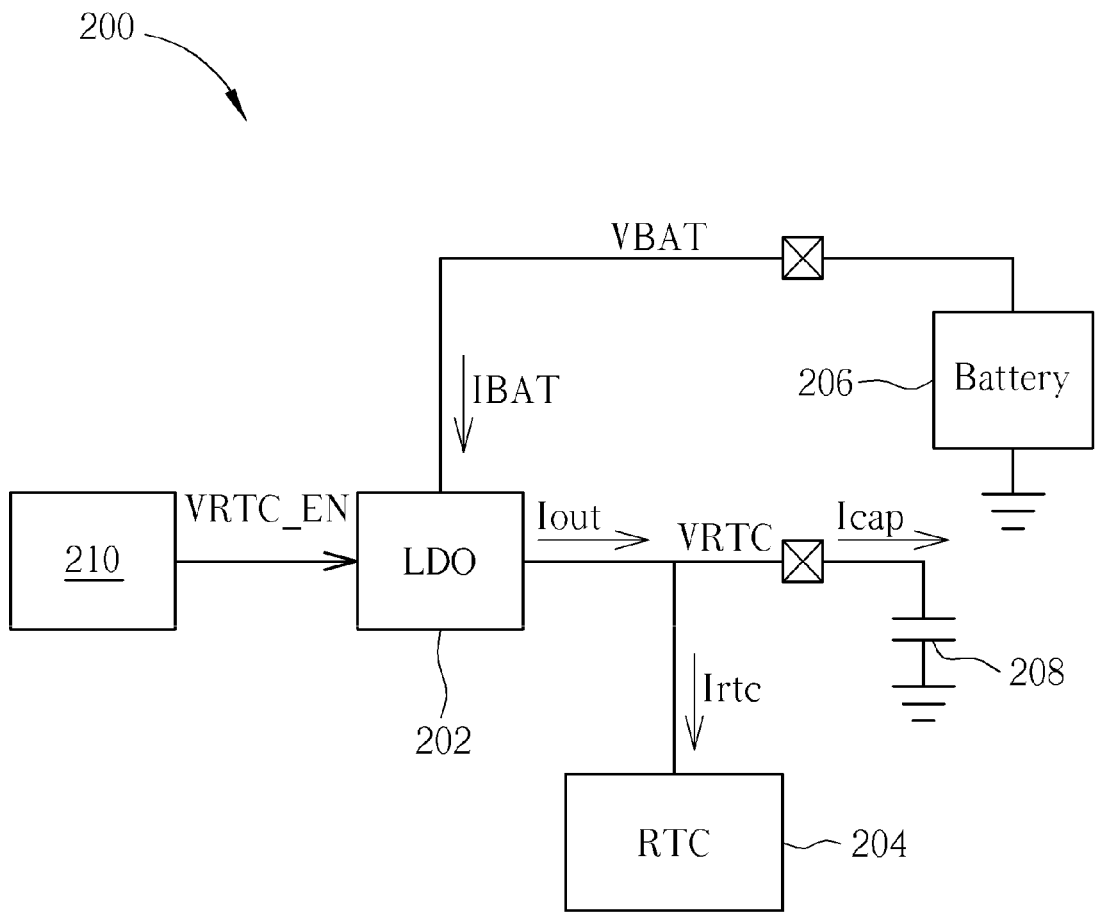
FIG. 2 is a diagram illustrating a PWM based RTC system according to a second embodiment of the invention.

FIG. 2 is a diagram illustrating a PWM based RTC system 200 according to a second embodiment of the invention. The PWM based RTC system 200 includes an LDO 202, an RTC 204, a battery 206, a capacitor 208 and an on-off logic 210. The battery 206 is an alternative power source of the PWM based RTC system 200, and may be a lithium battery, but is not limited thereto. The capacitor 208 may be placed outside an IC, in which the LDO 202, the RTC 204 and the on-off logic 210 are integrated. In another embodiment, capacitors may also be integrated in an IC along with other circuits.

The LDO 202 is for voltage regulating, and is enabled by a control signal VRTC_EN generated from the on-off logic 210. When the LDO 202 is enabled, a current Iout will be operably provided to the RTC 204 (Irtc) to charge the capacitor 208 (Icap); else, when the LDO 202 is disabled, current Iout will halt and current from the capacitor 208 will flow into the RTC 204 before the capacitor 208 is discharged to a certain level. As a result, the RTC 204 of the PWM based RTC system 200 can be sustained by using the capacitor 208 as the power source even if the LDO is disabled. Specifically, the size of the capacitor 208 determines the duration the RTC 204 can work after the current Iout is halted.

Initially, it is determined whether the RTC 204 is stable. Once the RTC 204 is stable, the on-off logic 210 operably generates the control signal VRTC_EN to periodically enable and disable the LDO 202. For instance, when the capacitor 208 is charged to a predetermined upper bound, the control signal VRTC_EN will become logic 0 (e.g. 0 v) from logic 1 (e.g. 3.7 v) to turn-off the high active LDO 202; when the capacitor 208 is discharged to a predetermined lower bound, the control signal VRTC_EN will become logic 1 from logic 0 to turn-on the LDO 202. Alternatively, when the capacitor 208 is charged for a predetermined duration, the control signal VRTC_EN will become logic 0 from logic 1 to turn-off the high active LDO 202; when the capacitor 208 is discharged for a predetermined duration, the control signal VRTC_EN will become logic 1 from logic 0 to turn-on the LDO 202. It should be noted that the specific logic of the on-off logic may be implemented by methods of diversity.

Figure 3:
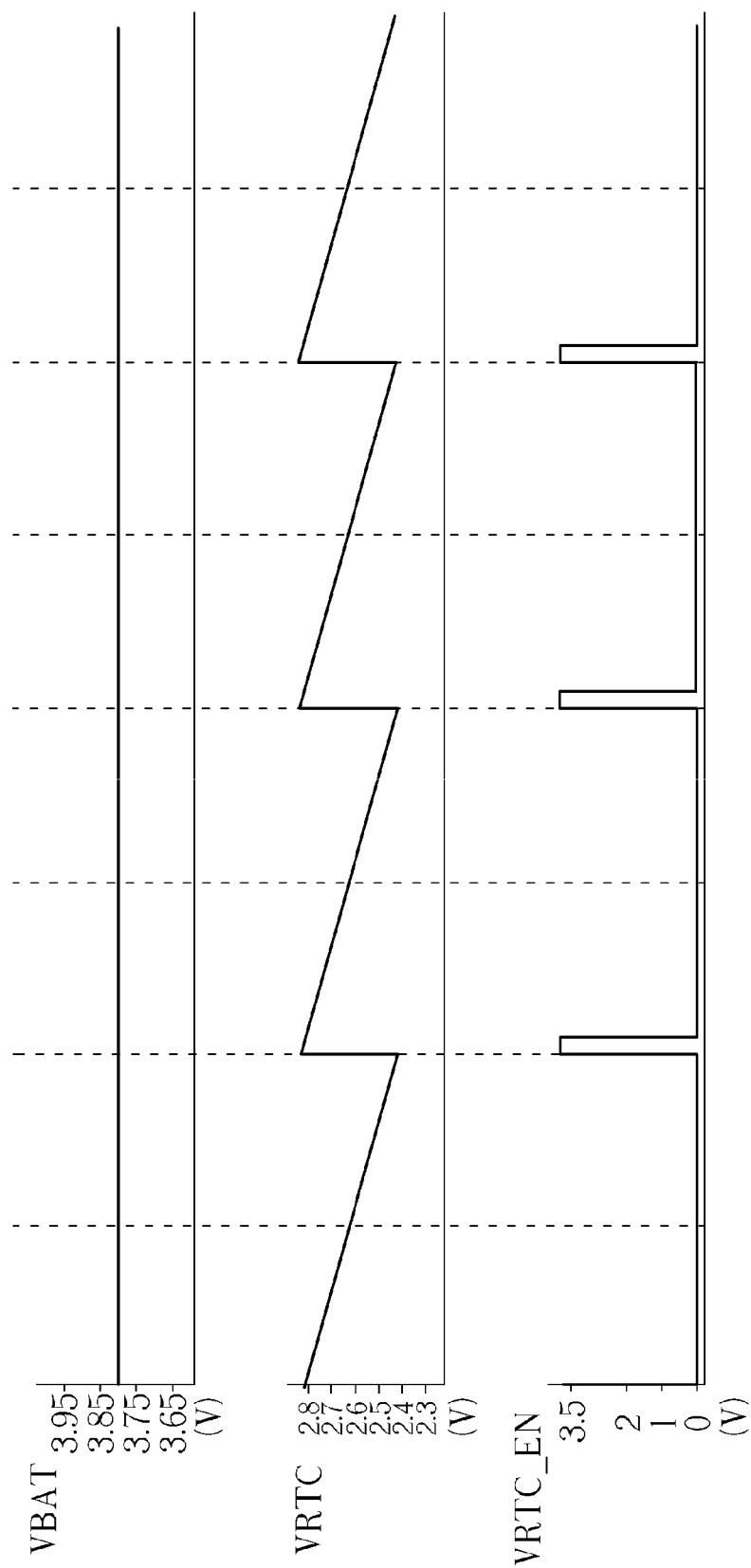
FIG. 3 is a waveform pot illustrating signals of the PWM based RTC system.

FIG. 3 is a waveform diagram illustrating signals of the PWM based RTC system. The output voltage VBAT of the battery 206 is 3.8V as depicted. The voltage level VRTC of the capacitor 208 swings around by 2.4-2.8 v in response to the control signal VRTC_EN. The duty cycle and period of the control signal VRTC_EN may be altered based on practical design specifications. For instance, the size of batteries and capacitors, or the specification of LDOs and RTCs may be taken into consideration.

Figure 4:
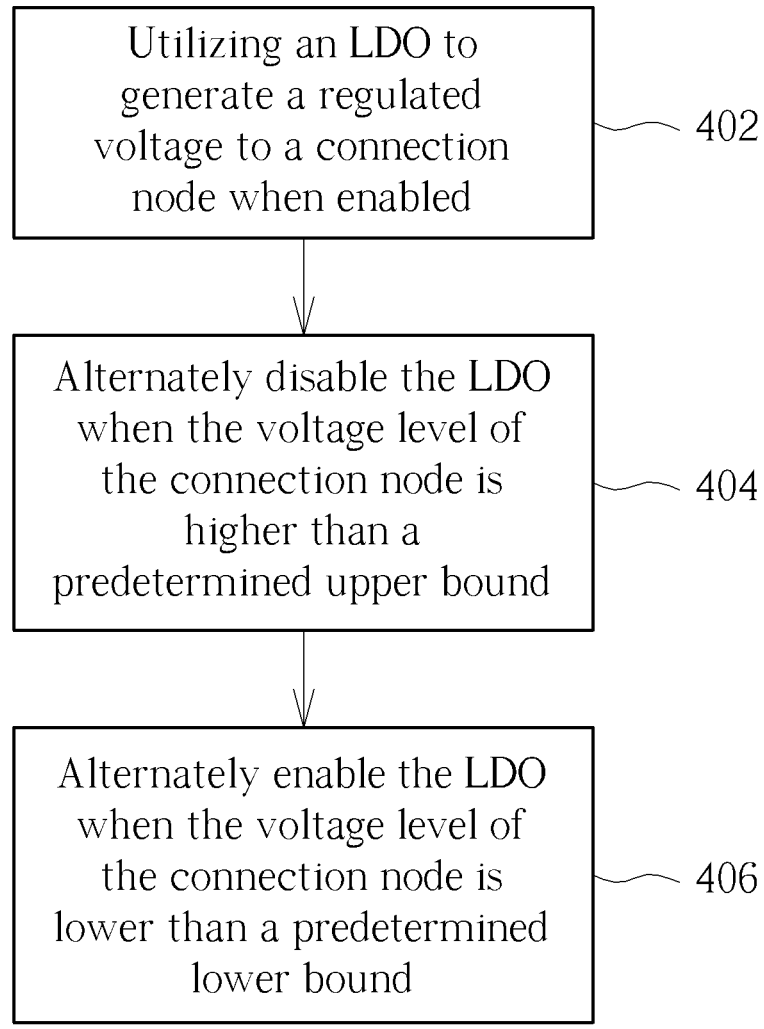
FIG. 4 is a flowchart illustrating the PWM based RTC method 400 according to an embodiment of the present invention.

FIG. 4 is a flowchart illustrating the PWM based RTC method 400 according to an embodiment of the present invention. The PWM based RTC method 400 can be applied to the PWM based RTC system 200 shown in FIG. 2. The PWM based RTC method 300 comprises the following steps.

Step 402: configure an LDO to generate a regulated voltage to a connection node when enabled;

Step 404: alternately enable the LDO when the voltage level of the connection node is higher than a predetermined upper bound; and Step 406: alternately disable the LDO when the voltage level of the connection node is lower than a predetermined lower bound.

Further details of steps 402-406 are similar to the aforementioned embodiments, and thus are omitted here for brevity.

As shown by the above method steps, leakage current of the PWM based RTC system 200 can be greatly saved since average turn-on time of the LDO 202 is reduced.

In particular, it is envisaged that the aforementioned inventive concept can be applied by a semiconductor manufacturer to any integrated circuit. It is further envisaged that a semiconductor manufacturer may employ the inventive concept in the design of a stand-alone device, or application-specific integrated circuit (ASIC) and/or any other subsystem element.

Aspects of the invention may be implemented in any suitable form including hardware, software, firmware or any combination of these. The invention may be implemented, at least partly, as computer software running on one or more data processors and/or digital signal processors or configurable module components such as FPGA devices. Thus, the elements and components of an embodiment of the invention may be physically, functionally and logically implemented in any suitable way. The functionality may be implemented in a single unit, in a plurality of units, or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor or controller. Additionally, although individual features may be included in different claims, these may be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved PWM based RTC system has been described, wherein the aforementioned disadvantages with prior art arrangements have been substantially alleviated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pulse width modulation (PWM) based Real-time clock (RTC) system, comprising:
    a voltage regulator circuit, arranged to generate a regulated voltage to a connection node when enabled;
    a capacitor, coupled to the connection node;
    an RTC circuit, coupled to the connection node; and
    an on-off logic, coupled to the voltage regulator circuit and arranged to alternately enable and disable the voltage regulator circuit.

2. The PWM based RTC system of claim 1, wherein the voltage regulator circuit is coupled to a battery, and is arranged to generate the regulated voltage according to a battery voltage of the battery.

3. The PWM based RTC system of claim 1, wherein the on-off logic alternately enables and disables the voltage regulator circuit according to a voltage level of the connection node.

4. The PWM based RTC system of claim 3, wherein the on-off logic enables the voltage regulator circuit when the voltage level of the connection node is lower than a predetermined lower bound.

5. The PWM based RTC system of claim 3, wherein the on-off logic disables the voltage regulator circuit when the voltage level of the connection node is higher than a predetermined upper bound.

6. The PWM based RTC system of claim 1, wherein the voltage regulator circuit, the RTC circuit and the on-off logic are integrated in an integrated circuit (IC).

7. The PWM based RTC system of claim 6, wherein the capacitor is integrated in the IC.

8. A PWM based RTC method, comprising:
    configuring a voltage regulator circuit to generate a regulated voltage to a connection node when enabled; and
    utilizing an on-off logic for alternately enabling and disabling the voltage regulator circuit;
    wherein the connection node is coupled to a capacitor and an RTC circuit.

9. The PWM based RTC method of claim 8, wherein the voltage regulator circuit is coupled to a battery, and the step of configuring the voltage regulator circuit to generate the regulated voltage to the connection node when enabled comprises:
    configuring the voltage regulator circuit to generate the regulated voltage according to a battery voltage of the battery.

10. The PWM based RTC method of claim 8, wherein the step of alternately enabling and disabling the voltage regulator circuit comprises:

alternately enabling and disabling the voltage regulator circuit according to a voltage level of the connection node.

11. The PWM based RTC method of claim 10, wherein the step of alternately enabling and disabling the voltage regulator circuit according to the voltage level of the connection node comprises:
   alternately disabling the voltage regulator circuit when the voltage level of the connection node is higher than a predetermined upper bound.

12. The PWM based RTC method of claim 10, wherein the step of alternately enabling and disabling the voltage regulator circuit according to the voltage level of the connection node comprises:
   alternately enabling the voltage regulator circuit when the voltage level of the connection node is lower than a predetermined lower bound.

13. The PWM based RTC method of claim 8, wherein the voltage regulator circuit and the RTC circuit are integrated in an IC.

14. The PWM based RTC method of claim 13, wherein the capacitor is integrated in the IC.

* * * * *